June 26, 1934.  E. F. GOODYEAR ET AL  1,964,383
CONTROL FOR AIRCRAFT AND OTHER VEHICLES
Filed Jan. 20, 1934
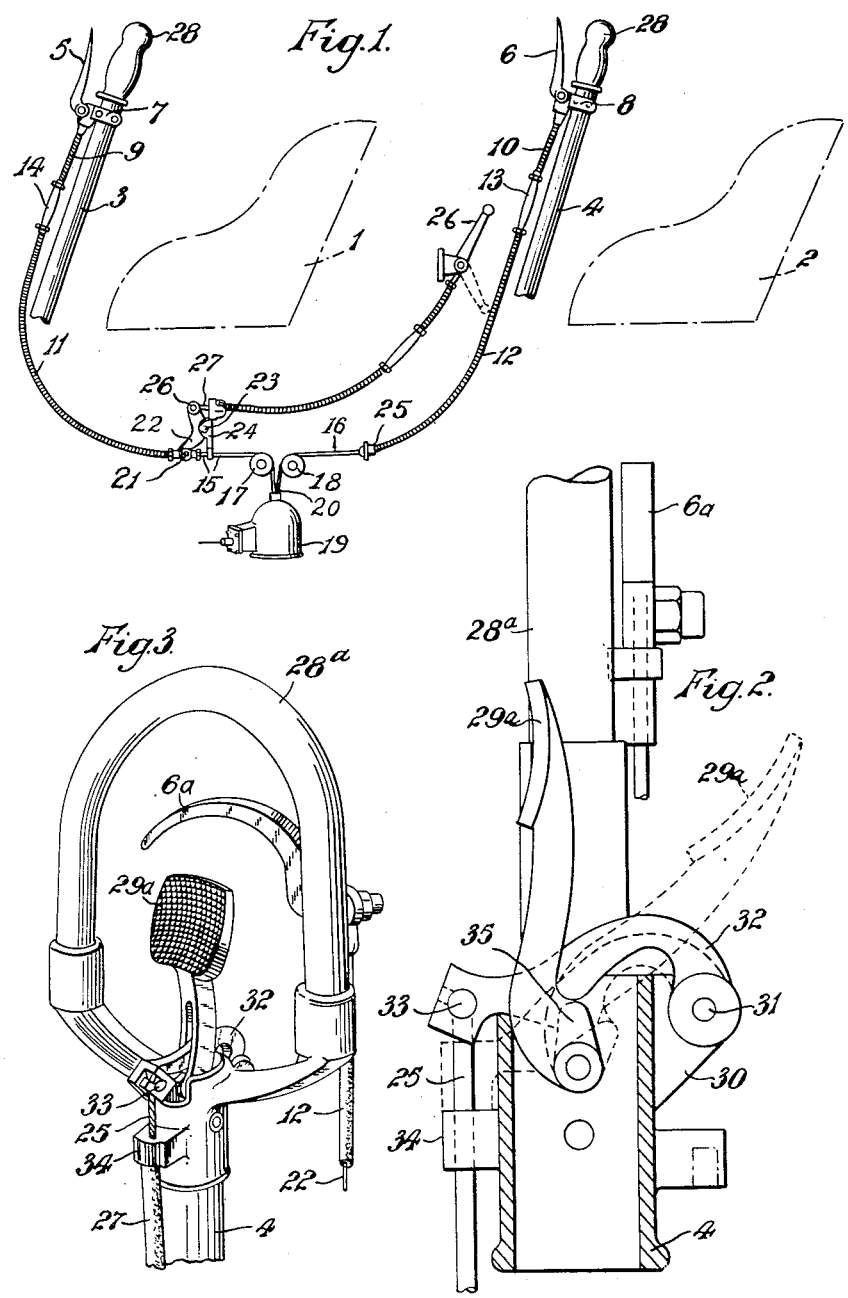
INVENTORS
Ernest Frederick Goodyear
Joseph Wright
Henry Trevaskis
by Usina + Rauber
Attorneys Patented June 26, 1934

1,964,383

UNITED STATES PATENT OFFICE 1,964,383

CONTROL FOR AIRCRAFT AND OTHER VEHICLES

Ernest Frederick Goodyear, Moxhull Park, Wishaw, Joseph Wright, Stoke Park, Coventry, and Henry Trevaskis, Keresley, Coventry, England, assignors to Dunlop Rubber Company Limited, London, England, a British corporation Application January 20, 1934, Serial No. 707,536
In Great Britain January 31, 1933

10 Claims. (Cl. 244—29)

This invention concerns improvements in controls for aircraft and other vehicles and more particularly concerns multi-control systems in which the operation or actuation of a particular mechanism may be performed from one of a number of seats or positions subject to overcontrol from one or more of these or from other positions.

The present invention is especially adapted for use in aircraft where dual control is commonly employed as for instance for teaching purposes, the pupil manoeuvring the aircraft by operating through one of a duplicate set of controls, the second set of which is interconnected with the first set for operation by the pilot during the more critical or difficult phases of the flight, during an emergency or for demonstration purposes.

By means of the present invention the instructor may allow the pupil to control the function of the mechanism with which the invention is associated until he himself wishes to resume control, and this resumption of control by the pilot is beyond the power of the pupil to alter in any way even though he may move his controls as usual.

Besides enabling the instructor's mastercontrol to render the pupil's control inoperative, the invention in its application to aircraft brakes, enables the instructor to exercise a degree of simultaneous control varying from no interference with the pupil to a complete substitution of his own control for that of the pupil.

In addition to the employment of the mastercontrol to negative the action of the pupil control as indicated above, the invention also enables the application of insufficient brake actuating pressure by the pupil to be followed up and watched by the instructor through suitable gauges and to be corrected and supplemented by the instructor or pilot in a positive manner by the contraction of the pilot's own finger lever to whatever extent may be required to provide the requisite additional pressure. When exercising control in this way the pilot may of course deem it advisable to render the pupil's control inoperative in the manner described above, before or as soon as he has increased the brake actuation to the required extent.

Other features of the invention consist in the simplicity, lightness and compactness of the moving parts, which is of importance in all transport vehicles and especially so in aircraft, together with the ease and economy of space with which the system may be inconspicuously installed and connected to meet the particular requirements of the controlling and master-controlling positions and seating disposition in each individual case.

The brake system and mechanism with which the present invention may be employed may be those for instance described in U. S. Patent No. 1,917,933, pending U. S. applications Ser. No. 629,260 filed August 18, 1932 and Ser. No. 669,294 and patents in the United Kingdom, the serial numbers of which are British Patents Nos. 397,896 and 399,622, which include brake systems actuated and controlled from the joystick and a fluid pressure relay unit, valves and brake drum gear for use with this form of hand control or with other types of brake control levers.

According to this invention we provide dual and multi-controls for aircraft and other vehicles characterized by operative connections to a common mechanism from a plurality of control positions through sheathed cables which are interconnected with a mastercontrol operable relatively to displace the sheaths and cables of the controls connected therewith to render them wholly or partly inoperative, the invention being further characterized in that the required displacement to render the controls inoperative is effected by displacing the abutment or abutments on which react the sheaths of the operative connections other than those of the mastercontrol, and in which actuation of the said mechanism is obtainable from one position independently of the mastercontrol through an independent sheathed cable, the operative connections from one of the control positions comprising two sheathed cables connected respectively to the master and another control, both of which are characterized by fixed cable sheath abutments.

In order that the invention may be more readily understood and carried into effect, it will now be described with reference to the accompanying drawing in which:—

Fig. 1 is a side elevation of the invention.

Fig. 2 is a part sectional side elevation of an alternative, simultaneously operable, spade grip control and mastercontrol shown in Fig. 3.

Fig. 3 is a part perspective elevation of the alternative form of control and overcontrol shown in Fig. 2.

In the embodiments of the invention chosen for purposes of illustration we control the brakes of an aeroplane from two positions or seats 1 and 2 respectively, with a mastercontrol at one of these positions as for instance at 2, in addition to the normal control thereat.

In front of each of the seats occupied by the crew of the aircraft, which may be behind one another, is placed one of two duplicate interconnected aerial navigation controls or joysticks 3 and 4, inclined at a suitable angle and terminating in handle portions 28.

Pivotally attached to the front side of each of these navigating controls are L-shaped bell crank finger levers 5 and 6, pivoted to brackets 7 and 8 clamped around the stem of each joystick, the short arms of these levers being connected in known manner adjacent their end to cables 9 and 10 respectively passing through their respective sheaths 11 and 12 and held in their respective brackets or adjacent parts.

If desired means may be provided with adjusting devices 13 and 14 for adjusting the length of the sheaths of the cables.

It will be assumed that the pupil takes the front seat 1 and the instructor takes the aft seat 2, that is to say the mastercontrol is exercised from the aft seat though either position may be chosen for this purpose.

The inner wires 15 and 16 constituting the central part or cable proper are led over guide wheels 17 and 18 respectively to the brake control mechanism 19 which controls the fluid pressure valve or valves of the brake operating mechanism and are interconnected at a common point 20 adjacent the mechanism or at the point of entry thereto as shown.

The unattached end of the sheath 11 at the part of the cable 15 remote from and leading to the pupil's control is connected to the end 21 of one arm of a crank 22 which is pivoted at 23 adjacent the apex of the crank to a second member 24 held fixed in a suitable position as for instance vertically for the purpose of illustration, and both the upper and lower ends of which are apertured.

The pupil's cable 15 then leaves its sheath and passes through an aperture in the second member 24 and over the guide pulley 17 to the valve gear unit and to the same brake valve or other mechanism actuating member which is moved by the instructor's duplicate and normal control.

The instructor's normal brake control cable 22 which is always operative as it is unaffected by operation of the master control, consists of a Bowden cable, the central wire 16 of which is connected at one end to the brake lever 6 on the joystick and at the other to the brake valve operating mechanism 19 and passes through a sheath which is connected at the upper or central end to the bracket 8 carrying the control and at the lower end to a suitable fixed abutment 25 carried upon a support not shown but which is common to the member 24, and to the bearings of the guide wheels 18 and 19.

Within reach of the instructor is a third control lever 26 whereby the instructor may prevent the pupil applying the brake, or if desired may vary the pressure applied by the pupil.

This third control lever is the master control lever and may also be pivotally attached to the joystick or may be attached to some surface within the convenient reach of the instructor's hand.

The master control lever is connected by means of the central wire 27 of a Bowden cable passing through an aperture in one end of the second fixed member 24 to the arm of the lever 28 opposite to the arm 18 to which the sheath of the cable from the pupil's control is attached.

The sheath 29 of the mastercontrol cable is secured to the opposite end of the fixed member 24 to that through which passes the pupil's cable.

In operation the occupant of either seat may actuate the brakes, the degree of actuation being recorded by means of fluid pressure gauges disposed in front of each seat in known manner.

Should the pupil apply excessive pressure, the instructor by moving the mastercontrol lever from the position shown in solid lines to the position shown in dotted lines causes the crank to rock in a direction such that the sheath 11 of the cable to the pupil's control is displaced or released to travel along its cable 15 in the same direction relative to the pivot of the lever 5 as the cable has been displaced thereby nullifying the effect of the latter's displacement.

It will be evident that the instructor may take this overcontrol movement before the pupil has used his control at all, thereby rendering the pupil's control inoperative or may operate it to modify or instantly to release any brake application effected by the pupil according to the severity of the emergency experienced.

In further modifications of the invention the pupil's navigating control may consist of a column with a spade grip 28a as shown in Fig. 3 having an arcuate brake lever 6a pivoted to one side of the spade and extending across the upper central portion thereof so that the lever can be contracted by the fingers against the under surface of the arcuate portion constituting the top of the spade grip.

The instructor's navigating control is similarly constructed but has added to it the master control thumb operable release lever 29a pivoted at its base to the base of the spade grip and tiltable outwardly from the plane of the spade to a position inclined to the plane of the spade as shown by the dotted lines in Fig. 2.

In this construction we provide on the forward face of the spade grip base, a fore and aft bracket 30 transversely apertured at 31 to which is pivoted a lever 32, the free end of which extends to the rear over the base of the grip and has a clamp 33 at its extreme end.

To the clamp 33 at the rear end of the lever is secured the cable 27 of the pilot's mastercontrol, the sheath being attached to a fixed bracket 34 beneath it.

The thumb lever has a wedge-shaped cam 35, the apex of which points upwards when in its vertical position to engage a cam surface on the pivoted lever 32 extending through the spade grip, the cable end of the lever being maintained by the cam in spaced relation to the abutment to which the sheath is attached as long as the overcontrol is inoperative.

In this position the mastercontrol cable is contracted and the sheath of the pupil's cable is drawn along its cable away from the abutment provided by the second member which is fixed.

The pupil may therefore effectively operate his brake control as long as the overcontrol thumb lever remains upright.

But when the instructor passes the overcontrol thumb lever outwards to the position shown by dotted lines in Fig. 2, the cam at the base of the thumb lever trips clear of the cam surface on the lever which passes to the rear across the base of the spade grip and the end of this lever 32 to which the central wire is attached falls downwards towards or upon the abutment 34 beneath it to which the sheath of the overcontrol cable is attached.

The effect of this is to release or remove the support from the end of the crank 22 to which the sheath of the pupil's cable is attached, and to allow this sheath 11 to become slack thereby rendering the pupil's control inoperative either completely in the case of the cam mechanism or to a degree dependent upon the degree of movement of the master control where other cam surfaces of greater radius of curvature are preferred.

While the invention has been described in relation to the dual control and overcontrol of brakes for aircraft, it will be apparent that such control may be applied for other purposes not necessarily only of an instructional nature, and that the controls and mastercontrols may be extended through several stages should this be required.

What we claim is:

1. Dual and multi-controls comprising a controlled element, individually operable control devices in master and pupil positions, and a master control in said master position, sheathed cables connecting said control devices with said controlled element to operate the latter by a displacement of said cables relative to their respective sheathes and means operable by said master control to displace the sheath of the control in the pupil position relative to its respective cable to render said cable wholly or partly inoperative.

2. The control mechanism of claim 1 in which one sheathed cable is operable independently of the master control.

3. The control mechanism of claim 1 in which operative connections from the master control position comprise two sheathed cables connected respectively to the master control and to control device and a fixed cable sheath abutment for the sheath of each of said cables.

4. The control mechanism of claim 1 having the sheath of the mastercontrol cable connected to a fixed abutment and a lever having one arm secured to said cable and the other arm connected to a movable sheath of a pupil position control.

5. The control mechanism of claim 1 and having two interconnected air navigating controls of an aeroplane and actuating levers attached to one of said controls for independent displacement with and independently in relation thereto.

6. The control mechanism of claim 1 wherein the mastercontrol and normal operative control from the master position are both operable at the same time.

7. The control mechanism of claim 1 and having two interconnected air navigating controls of an aeroplane and having its actuating levers attached to one of said controls for independent displacement with and independently in relation thereto in which the mastercontrol lever and the control lever associated therewith respectively consist of an arcuate finger lever and a thumb lever carried on the same air navigation control.

8. The control mechanism of claim 1 wherein the mastercontrol and normal operative control from the master position are both operable at the same time in which the mastercontrol lever and the control lever associated therewith respectively consist of an arcuate finger lever and a thumb lever carried on the same air navigation control.

9. The control mechanism of claim 1 in which the cables of all the operative connections except the master are connected to a common mechanism.

10. The control mechanism of claim 1 in which the other control cables are connected to the fluid pressure brake actuating mechanism of an aeroplane.

ERNEST FREDERICK GOODYEAR.
JOSEPH WRIGHT.
HENRY TREVASKIS.